United States Patent
Blok et al.

(10) Patent No.: US 10,882,981 B2
(45) Date of Patent: Jan. 5, 2021

(54) PROPYLENE-BASED POLYMER ADDITIVES FOR IMPROVED TIRE TREAD PERFORMANCE

(71) Applicant: ExxonMobil Chemical Patents Inc., Baytown, TX (US)

(72) Inventors: Edward J. Blok, Huffman, TX (US); Anthony J. Dias, Houston, TX (US); Sunny Jacob, Seabrook, TX (US); Ian C. Stewart, Houston, TX (US); Yong Yang, Kingwood, TX (US); Jingwen Zhang, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/507,400

(22) PCT Filed: Aug. 31, 2015

(86) PCT No.: PCT/US2015/047771
§ 371 (c)(1),
(2) Date: Feb. 28, 2017

(87) PCT Pub. No.: WO2016/053541
PCT Pub. Date: Apr. 7, 2016

(65) Prior Publication Data
US 2017/0292013 A1      Oct. 12, 2017

Related U.S. Application Data

(60) Provisional application No. 62/057,539, filed on Sep. 30, 2014.

(30) Foreign Application Priority Data

Dec. 10, 2014    (EP) .................................... 14197135

(51) Int. Cl.
| | |
|---|---|
| *C08L 9/06* | (2006.01) |
| *B60C 1/00* | (2006.01) |
| *C08L 7/00* | (2006.01) |
| *C08L 9/00* | (2006.01) |

(52) U.S. Cl.
CPC .............. *C08L 9/06* (2013.01); *B60C 1/0016* (2013.01); *C08L 7/00* (2013.01); *C08L 9/00* (2013.01); *C08L 2205/06* (2013.01); *C08L 2312/00* (2013.01)

(58) Field of Classification Search
CPC .......... C08L 23/16; C08L 9/00; B60C 1/0016; B60C 1/00; Y10T 152/10495; C08F 255/06
See application file for complete search history.

(56) References Cited

U.S. PATENT DOCUMENTS

| | | | |
|---|---|---|---|
| 3,897,405 A | 7/1975 | Son et al. | |
| 4,465,829 A | 8/1984 | Graves | |
| 4,814,384 A * | 3/1989 | Mitchell | ................. C08L 21/00 525/211 |
| 6,133,378 A * | 10/2000 | Davis | ...................... C08L 23/04 524/401 |
| 6,331,360 B1 * | 12/2001 | Sugimoto | ............... C08L 23/02 428/500 |
| 7,867,433 B2 | 1/2011 | Jacob et al. | |
| 8,013,069 B2 | 9/2011 | Harrington et al. | |
| 8,580,877 B2 | 11/2013 | Tsou et al. | |
| 8,742,019 B2 | 6/2014 | Jacob et al. | |
| 8,841,383 B2 * | 9/2014 | Rodgers | ................ B60C 1/0025 525/191 |
| 9,273,163 B2 | 3/2016 | Crowther et al. | |
| 9,527,933 B2 | 12/2016 | Kulkarni et al. | |
| 2006/0183862 A1 | 8/2006 | Wang et al. | |
| 2007/0167553 A1 | 7/2007 | Westwood et al. | |
| 2009/0115108 A1* | 5/2009 | Rodgers | ................ B60C 1/0025 264/331.15 |
| 2012/0245293 A1 | 9/2012 | Crowther et al. | |
| 2012/0245300 A1 | 9/2012 | Crowther et al. | |
| 2017/0233513 A1 | 8/2017 | Tsou et al. | |

FOREIGN PATENT DOCUMENTS

| | | |
|---|---|---|
| DE | 19653371 | 6/1998 |
| EP | 1008464 | 6/2000 |
| JP | 2001002733 A | 1/2001 |
| WO | 2005049670 | 6/2005 |

\* cited by examiner

*Primary Examiner* — Gregory Listvoyb

(57) ABSTRACT

A tire tread composition is disclosed. The tire tread composition includes components, by weight of the composition, within the range from: 5 to 75 wt % of a diene elastomer; 0 to 40 wt % of processing oil; 20 to 80 wt % of filler; a curative agent; and 5 to 30 wt % of a propylene-ethylene-diene terpolymer containing from 2 wt % to 40 wt % of ethylene and/or $C_4$-$C_{20}$ α-olefins derived units, from 0.5 to 10 wt % of diene derived units, and having a heat of fusion, as determined by DSC, of from 0 J/g to 80 J/g.

9 Claims, 1 Drawing Sheet

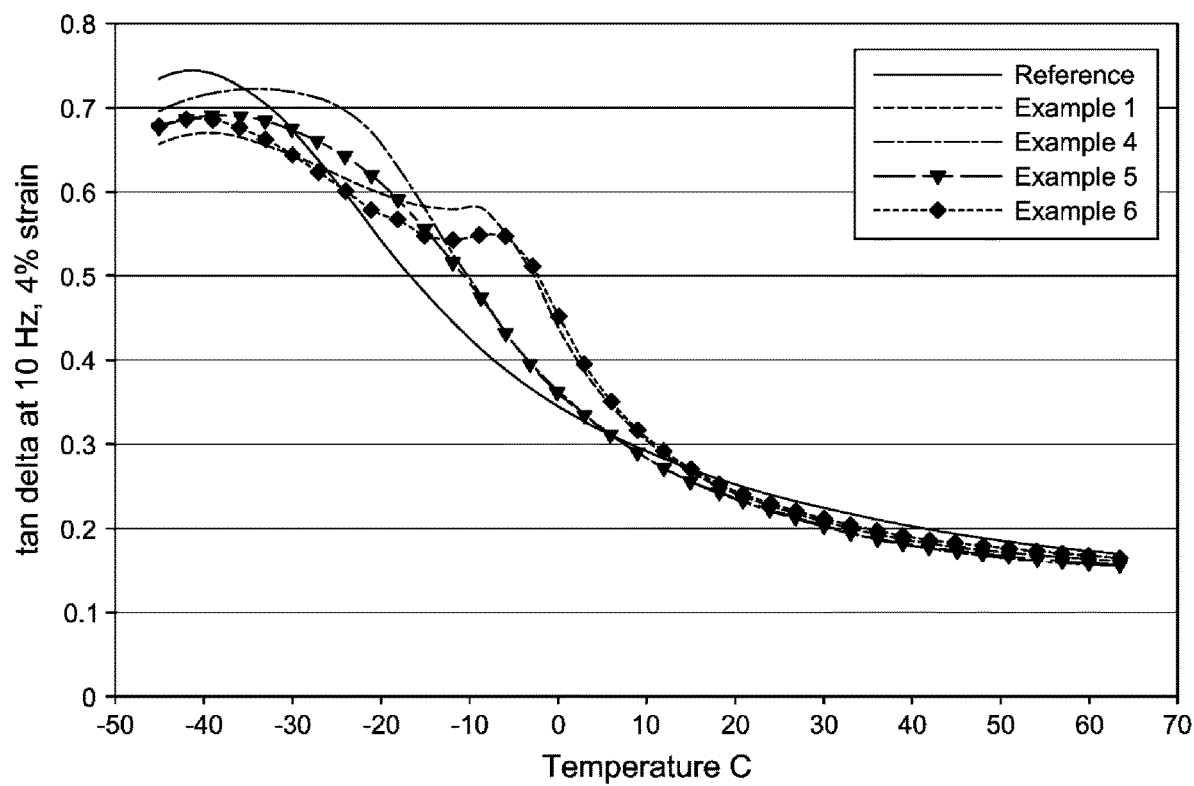

ized gels from Lanxess with cross-linked butadiene cores and acrylic shells, is another additive used to increase the wet traction without affecting rolling resistance. However, Nanoprene can only deliver limited improvement in wet traction.
PROPYLENE-BASED POLYMER ADDITIVES FOR IMPROVED TIRE TREAD PERFORMANCE

CROSS-REFERENCE TO RELATED APPLICATIONS

This present application is a National Stage Application of International Application No. PCT/US2015/047771 filed Aug. 31, 2015, which claims priority to and the benefit of U.S. Ser. No. 62/057,539, filed Sep. 30, 2014, and EP application 14197135.8, filed Dec. 10, 2014, the disclosures of which are fully incorporated herein by their entireties.

FIELD OF THE INVENTION

The present invention relates to propylene-ethylene-diene terpolymers useful as modifiers for tire treads.

BACKGROUND OF THE INVENTION

The tire tread compound is an important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound Tg would provide better wet traction but, at the same time, increase the rolling resistance and tread wear. There are needs to develop a tread compound additive that can provide good wet traction without increasing the rolling resistance and tread wear.

Functionalized SBR (styrene butadiene rubber) is one method to improve this trade-off by improving filler dispersion. Nanoprene™, sub-micron to micron sized gels from Lanxess with cross-linked butadiene cores and acrylic shells, is another additive used to increase the wet traction without affecting rolling resistance. However, Nanoprene can only deliver limited improvement in wet traction.

Related references include US 2012-0245293; US 2012-0245300; U.S. Ser. No. 61/704,611 filed on Sep. 24, 2012; and U.S. Ser. No. 61/704,725 filed on Sep. 24, 2012.

SUMMARY OF THE INVENTION

Described herein is a tire tread composition includes components, by weight of the composition, within the range from: 5 to 75 wt % of a diene elastomer; 0 to 40 wt % of processing oil; 20 to 80 wt % of filler; a curative agent; and 5 to 30 wt % of a propylene-ethylene-diene terpolymer containing from 2 wt % to 40 wt % of ethylene and/or $C_4$-$C_{20}$ α-olefins derived units and having a heat of fusion, as determined by DSC, of from 0 J/g to 80 J/g.

Also disclosed is a method of balancing the wet traction performance and rolling resistance in a tire tread comprising combining at least a filler, a diene-elastomer, and a curative agent with one or more propylene-ethylene-diene terpolymers to form a tire tread; wherein the propylene-ethylene-diene terpolymer containing from 2 wt % to 40 wt % of ethylene and/or $C_4$-$C_{20}$ α-olefins derived units and having a heat of fusion, as determined by DSC, of from 0 J/g to 80 J/g; and effecting a cure of the components to form a tire tread; wherein the level of the propylene-ethylene-diene terpolymer(s) relative to the other components, and its comonomer content, can be varied to improve the balance of wet traction and rolling resistance of a tire tread.

BRIEF DESCRIPTION OF THE DRAWINGS

FIG. 1 are Dynamic Mechanical Thermal Analysis (DMTA) curves of several embodiments of tire tread compositions disclosed herein.

DETAILED DESCRIPTION OF THE INVENTION

This invention is directed to the use of propylene-ethylene-diene terpolymers in tire tread compositions. The propylene-ethylene-diene terpolymers are prepared by polymerizing propylene with at least one of ethylene and $C_4$-$C_{20}$ α-olefins, and, optionally, one or more dienes such as ethylidene norbornene. The propylene-ethylene-diene terpolymers contain from 5 wt % to 40 wt % of ethylene and/or $C_4$-$C_{20}$ α-olefins derived units and having a heat of fusion, as determined by DSC, of from 0 J/g to 80 J/g.

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Raising the composition's Tg would provide good wet traction but, at the same time, increase the rolling resistance and tread wear. The embodiments described herein provide a tread compound additive that can accomplish wet traction without lowering the rolling resistance and tread wear.

The problem has been approached by developing an additive, a polypropylene-ethylene-diene terpolymer that increases hysteresis in the wet traction region (0° C.) and lowers hysteresis in the rolling resistance region (60° C.) without changing the overall compound Tg.

The additive compounding step allows one to address the known deficiencies of poly olefin blends with styrene-butadiene rubber/polybutadiene/natural rubber (SBR/PBD/NR) compositions by concentrating the carbon black and antioxidant in the polyolefin domain to improve abrasion resistance, cure state and UV stability. These deficiencies include poorly vulcanized and poorly reinforced polyolefin domains as curatives and fillers migrate away from the polyolefin due to unfavorable solubility parameter differences. The present embodiments described herein overcome one or more of these deficiencies.

Propylene-Ethylene-Diene Terpolymer

The "propylene-ethylene-diene terpolymer" as used herein may be any polymer comprising propylene and other comonomers. The term "polymer" refers to any carbon-containing compound having repeat units from one or more different monomers. Preferably the propylene-ethylene-diene terpolymer comprises propylene-derived units, α-olefin-derived units and, optionally, diene-derived units. For example, the propylene-ethylene-diene terpolymer may be a propylene-α-olefin polymer, propylene-α-olefin-diene terpolymer, or propylene-diene copolymer. The propylene-ethylene-diene terpolymer may be prepared by polymerizing propylene with at least one of ethylene and $C_4$-$C_{20}$ α-olefins, and, optionally, one or more dienes.

The comonomers may be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

The propylene-ethylene-diene terpolymer may have a propylene amount of from 60 wt % to 95 wt %, or from 65 wt % to 95 wt %, or from 70 wt % to 95 wt %, or from 75 wt % to 95 wt %, or from 80 wt % to 95 wt %, or from 83 wt % to 95 wt %, or from 84 wt % to 95 wt %, or from 84 wt % to 94 wt %, based on the weight of the polymer. The balance of the propylene-ethylene-diene terpolymer comprises at least one of ethylene and $C_4$-$C_{20}$ α-olefin and, optionally, one or more dienes. The α-olefin may be ethylene, butene, hexane, or octene. When two or more α-olefins are present in the polymer, ethylene and at least one of butene, hexane, or octene are preferred.

Preferably, the propylene-ethylene-diene terpolymer comprises from 5 to 40 wt % of $C_2$ and/or $C_4$-$C_{20}$ α-olefins based the weight of the propylene-ethylene-diene terpolymer. When two or more of ethylene and $C_4$-$C_{20}$ α-olefins are present the combined amounts of these olefins in the polymer is preferably at least 5 wt % and falling within the ranges described herein. Other preferred ranges of the amount of ethylene and/or one or more α-olefins include from 5 wt % to 35 wt %, or from 5 wt % to 30 wt %, or from 5 wt % to 25 wt %, or from 5 wt % to 20 wt %, or from 5 to 17 wt %, or from 5 wt % to 16 wt %, or from 6 wt % to 16 wt %, based on the weight of the propylene-ethylene-diene terpolymer.

Preferably, the propylene-ethylene-diene terpolymer comprises a diene content of from 0.2 wt % to 24 wt % based on the weight of the polymer, or from 0.5 wt % to 12 wt %, or 0.6 wt % to 8 wt %, or from 0.7 wt % to 5 wt %. Other preferred ranges may include from 0.2 wt % to 10 wt %, or from 0.2 wt % to 5 wt %, or from 0.2 wt % to 4 wt %, or from 0.2 wt % to 3.5 wt %, or from 0.2 wt % to 3.0 wt %, or from 0.2 wt % to 2.5 wt % based on the weight of the polymer. In one or more embodiments, the propylene-ethylene-diene terpolymer may comprise 5-ethylidene-2-norbornene in an amount of from 0.5 wt % to 10 wt %, or from 0.5 wt % to 4 wt %, or from 0.5 wt % to 2.5 wt %, or from 0.5 wt % to 2.0 wt %.

The propylene-ethylene-diene terpolymer may have a weight average molecular weight (Mw) of 5,000,000 or less, a number average molecular weight (Mn) of 3,000,000 or less, a z-average molecular weight (Mz) of 10,000,000 or less, and a g' index of 0.95 or greater measured at the weight average molecular weight (Mw) of the polymer using isotactic polypropylene as the baseline.

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the SEC columns was directed into the miniDAWN (Wyatt Technology, Inc.) optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in 34(19) MACROMOLECULES, 6812-6820, (2001).

The propylene-ethylene-diene terpolymer may have an Mw of from 5,000 to 5,000,000 g/mole, or from 10,000 to 1,000,000 g/mole, or from 20,000 to 500,000 g/mole, or from 50,000 to 400,000 g/mole. The propylene-ethylene-diene terpolymer may have an Mn of 2,500 to 2,500,000 g/mole, or from 5,000 to 500,000 g/mole, or from 10,000 to 250,000 g/mole, or from 25,000 to 200,000 g/mole. The propylene-ethylene-diene terpolymer may have an Mz of 10,000 to 7,000,000 g/mole, or from 50,000 to 1,000,000 g/mole, or from 80,000 to 700,000 g/mole, or from 100,000 to 500,000 g/mole.

The molecular weight distribution index (MWD=(Mw/Mn)) of the propylene-ethylene-diene terpolymer may be from 1.5 to 40. For example, the propylene-ethylene-diene terpolymer may have an MWD with an upper limit of 40, or 20, or 10, or 5, or 4.5, or 3, and a lower limit of 1.5, or 1.8, or 2.0. In one or more embodiments, the MWD of the propylene-ethylene-diene terpolymer is 1.8 to 5, or from 1.8 to 3.

The propylene-ethylene-diene terpolymer may have a g' index value of 0.95 or greater, or at least 0.98, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-ethylene-diene terpolymer and $\eta_l$ is the intrinsic viscosity of a linear polymer of the same viscosity-averaged molecular weight ($M_v$) as the propylene-ethylene-diene terpolymer. Thus, $\eta_{11}=KM_v^{\alpha}$, where K and α are measured values for linear polymers and should be obtained on the same instrument as the one used for the g' index measurement, which is described above for the GPC-SEC method above for determining molecular weights.

The propylene-ethylene-diene terpolymer may have a density of from 0.85 g/cm$^3$ to 0.92 g/cm$^3$, or from 0.87 g/cm$^3$ to 0.90 g/cm$^3$, or from 0.88 g/cm$^3$ to 0.89 g/cm$^3$, at room temperature as measured per the ASTM D-1505 test method.

The propylene-ethylene-diene terpolymer may have a melt flow rate (MFR, 2.16 kg weight at 230° C.), equal to or greater than 0.2 g/10 min as measured according to the ASTM D-1238. Preferably, the MFR (2.16 kg at 230° C.) is from 0.5 g/10 min to 200 g/10 min, or from 1 g/10 min to 100 g/10 min, or from 2 g/10 min to 30 g/10 min, or from 5 g/10 min to 30 g/10 min, or from 10 g/10 min to 30 g/10 min, or from 10 g/10 min to 25 g/10 min.

The propylene-ethylene-diene terpolymer may have a Mooney viscosity ML (1+4) at 125° C., as determined according to ASTM D1646, of less than 100, or less than 75, or less than 60, or less than 30.

The propylene-ethylene-diene terpolymer may have a heat of fusion ($H_f$) determined by the DSC procedure described herein, which is greater than or equal to 0 Joules per gram (J/g), and is equal to or less than 80 J/g, or equal to or less than 75 J/g, or equal to or less than 70 J/g, or equal to or less than 60 J/g, or equal to or less than 50 J/g, or equal to or less than 35 J/g. Also preferably, the propylene-ethylene-diene terpolymer may have a heat of fusion that is greater than or equal to 1 J/g, or greater than or equal to 5 J/g. Preferred propylene-ethylene-diene terpolymers may have a heat of fusion ranging from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-ethylene-diene terpolymer may be expressed in terms of percentage of crystallinity (i.e., % crystallinity), as determined according to the DSC procedure described herein. The propylene-ethylene-diene terpolymer may have a % crystallinity of from 0% to 40%, or from 1% to 30%, or from 5% to 25%. In one or more embodiments, the propylene-ethylene-diene terpolymer may have crystallinity of less than 40%, or from 0.25% to 25%, or from 0.5% to 22%, or from 0.5% to 20%.

The propylene-ethylene-diene terpolymer preferably may have a single broad melting transition. However, the propylene-ethylene-diene terpolymer may show secondary melting peaks adjacent to the principal peak, but for purposes herein, such secondary melting peaks are considered together as a single melting point, with the highest of these peaks (relative to baseline as described herein) being considered as the melting point of the propylene-ethylene-diene terpolymer.

The propylene-ethylene-diene terpolymer may have a melting point, as measured by the DSC procedure described herein, of equal to or less than 100° C., or less than 90° C., or less than 80° C., or less than or equal to 75° C. In one or more embodiments, the propylene-ethylene-diene terpolymer may have a melting point of from 25° C. to 80° C., or from 25° C. to 75° C., or from 30° C. to 65° C.

The Differential Scanning calorimetry (DSC) procedure may be used to determine heat of fusion and melting temperature of the propylene-ethylene-diene terpolymer. The method is as follows: approximately 6 mg of material placed in microliter aluminum sample pan. The sample is placed in a Differential Scanning calorimeter (Perkin Elmer Pyris 1 Thermal Analysis System) and is cooled to −80° C. The sample is heated at 10° C./min to attain a final temperature of 120° C. The sample is cycled twice. The thermal output, recorded as the area under the melting peak of the sample, is a measure of the heat of fusion and may be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-ethylene-diene terpolymer may have a triad tacticity of three propylene units, as measured by $^{13}C$ NMR of 75% or greater, or 80% or greater, or 82% or greater, or 85% or greater, or 90% or greater. Other preferred ranges may include from 75% to 99%, or from 80% to 99%, or from 85% to 99%. Triad tacticity is determined by the methods described in US 2004/0236042.

The propylene-ethylene-diene terpolymer may be a blend of discrete random propylene-ethylene-diene terpolymers as long as the polymer blend has the properties of the propylene-ethylene-diene terpolymer as described herein. The number of propylene-ethylene-diene terpolymers may be three or less, or two or less. In one or more embodiments, the propylene-ethylene-diene terpolymer may include a blend of two propylene-ethylene-diene terpolymers differing in the olefin content, the diene content, or the both. Preparation of such polymer blend may be found in US 2004/0024146 and US 2006/0183861.

The inventive compositions may include the propylene-ethylene-diene terpolymer in an amount of from 5 wt % to 99 wt %, e.g., 5 wt % to 30 wt %, based on the weight of the composition. Preferably, the composition includes the propylene-ethylene-diene terpolymer in an amount of from a low of 5 wt %, or 10 wt %, or 15 wt %, or 20 wt %, or 25 wt %, or 30 wt %, or 35 wt %, or 40 wt %, or 50 wt %, or 60 wt %, or 70 wt %, or 75 wt %, to an upper limit of 70 wt %, or 80 wt %, or 85 wt %, or 90 wt %, or 95 wt %, based on the weight of the composition so long as the low value is less than the high value.

Elastomers

The inventive tire tread compositions also comprise an elastomer. Generally the range of the elastomer is from 5 to 75% by weight of the tire tread composition. Suitable elastomers include, for example, diene elastomers.

"Diene elastomer" is understood to mean, in known manner, an elastomer resulting at least in part (homopolymer or copolymer) from diene monomers (monomers bearing two double carbon-carbon bonds, whether conjugated or not).

A diene elastomer can be "highly unsaturated," resulting from conjugated diene monomers, which have a greater than 50% molar content of units.

According to one aspect, each diene elastomer having a Tg from −75° C. to −40° C. is selected from the group consisting of styrenebutadiene copolymers, natural polyisoprenes, synthetic polyisoprenes having a cis-1,4 linkage content greater than 95%, styrene/butadiene/isoprene terpolymers and a mixture of these elastomers, and each diene elastomer having a Tg from −110° C. to −75° C., preferably from −100° C. to −80° C., is selected from the group consisting of polybutadienes having a cis-1,4 linkage content greater than 90% and isoprene/butadiene copolymers comprising butadiene units in an amount equal to or greater than 50%.

In another aspect, each diene elastomer having a Tg from −75° C. to −40° C. is selected from the group consisting of natural polyisoprenes and synthetic polyisoprenes having a cis-1,4 linkage content greater than 95%, and each diene elastomer having a Tg from −110° C. to −75° C. is a polybutadiene having a cis-1,4 linkage content greater than 90%.

In one embodiment, the composition comprises a blend of the diene elastomer(s) having a Tg from −75° C. to −40° C. and each of the diene elastomer(s) having a Tg from −110° C. to −75° C.

In one aspect, the composition comprises a blend of at least one of the polybutadienes having a cis-1,4 linkage content greater than 90% with at least one of the natural or synthetic polyisoprenes (having a cis-1,4 linkage content greater than 95%).

In another aspect, the composition comprises a blend of at least one of the polybutadienes having a cis-1,4 linkage content greater than 90% with at least one of the terpolymers of styrene, isoprene and butadiene.

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used herein is understood more particularly to mean: (a) any homopolymer obtained by polymerization of a conjugated diene monomer having from 4 to 12 carbon atoms; (b) any copolymer obtained by copolymerization of one or more conjugated dienes with one another or with one or more vinylaromatic compounds having from 8 to 20 carbon atoms; (c) a ternary copolymer obtained by copolymerization of ethylene and of an alpha-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; (d) a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di(C1-C5 alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise from 99% to 20% by weight of diene units and from 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol ends, alkoxysilane groups, carboxyl groups, or polyether groups.

The following are suitable: polybutadienes, in particular those having a content (molar %) of 1,2-units of from 4% to 80% or those having a content (molar %) of cis-1,4-units of greater than 80%, polyisoprenes, butadiene/styrene copolymers and in particular those having a Tg (glass transition temperature, measured according to Standard ASTM D3418) of from 0° C. to −70° C. and more particularly from −10° C. to −60° C., a styrene content of from 5% to 60% by weight and more particularly from 20% to 50%, a content (molar %) of 1,2-bonds of the butadiene part of from 4% to 75% and a content (molar %) of trans-1,4-bonds of from 10% to 80%, butadiene/isoprene copolymers, in particular those having an isoprene content of from 5% to 90% by weight and a Tg of −40° C. to −80° C., or isoprene/styrene copolymers, in particular those having a styrene content of from 5% to 50% by weight and a Tg of from −25° C. to −50° C. In the case of butadiene/styrene/isoprene copolymers, those having a styrene content of from 5% to 50% by weight and more particularly of from 10% to 40%, an isoprene content of from 15% to 60% by weight and more particularly from 20% to 50%, a butadiene content of from 5% to 50% by weight and more particularly of from 20% to 40%, a content (molar %) of 1,2-units of the butadiene part of from 4% to 85%, a content (molar %) of trans-1,4-units of the butadiene part of from 6% to 80%, a content (molar %) of 1,2-plus 3,4-units of the isoprene part of from 5% to 70% and a content (molar %) of trans-1,4-units of the isoprene part of from 10% to 50%, and more generally any butadiene/styrene/isoprene copolymer having a Tg of from −20° C. to −70° C., are suitable in particular.

The diene elastomer chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

According to a specific embodiment, the diene elastomer is predominantly (i.e., for more than 50 wt %) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of from 20% to 35% by weight, or a high styrene content, for example from 35 to 45%, a content of vinyl bonds of the butadiene part of from 15% to 70%, a content (molar %) of trans-1,4-bonds of from 15% to 75% and a Tg of from −10° C. to −55° C.; such an SBR can advantageously be used as a mixture with a BR preferably having more than 90% (molar %) of cis-1,4-bonds.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber IM), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to still another aspect, the rubber composition comprises a blend of a (one or more) "high Tg" diene elastomer exhibiting a Tg of from −70° C. to 0° C. and of a (one or more) "low Tg" diene elastomer exhibiting a Tg of from −110° C. to −80° C., more preferably from −100° C. to −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRS, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another embodiment of the invention, the rubber composition comprises, for example, from 30 to 100 phr, in particular from 50 to 100 phr (parts by weight per hundred parts of total elastomer), of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions described herein can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

The inventive tire tread compositions comprise within the range from 5 or 10 wt % to 15 or 20 or 25 wt %, by weight of the composition of the propylene-ethylene-diene terpolymer which is a propylene-α-olefin elastomer. Such elastomers are described in, for example, U.S. Pat. Nos. 7,390,866 and 8,013,093, and are sold under such names as Vistamaxx™ Tafmer™, and Versify™. Generally, these are random polypropylene copolymers having from 5 to 25 wt % ethylene or butene-derived comonomer units having limited isotactic sequences to allow for some level of crystallinity, the copolymers in some embodiments, having a weight average molecular weight within the range of from 10,000 or 20,000 g/mole to 100,000 or 200,000 or 400,000 g/mole and a melting point (DSC) of less than 110 or 100° C.

In one embodiment, the tire tread composition does not include 4 to 20 wt % of a polyolefin-polybutadiene block-copolymer, wherein the polyolefin-polybutadiene block-copolymer is a block copolymer having the general formula: PO-XL-fPB; where "PO" is a polyolefin block having a weight average molecular weight within the range from 1000 to 150,000 g/mole, the "fPB" is a functionalized polar polybutadiene block having a weight average molecular weight within the range from 500 to 30,000 g/mole, and "XL" is a crosslinking moiety that covalently links the PO and fPB blocks; and wherein the Maximum Energy Loss (Tangent Delta) of the immiscible polyolefin domain is a temperature within the range from −30° C. to 10° C.

Although any styrenic copolymer is useful, those most desirable in the tire compositions are styrene-butadiene block copolymer "rubbers." Such rubbers preferably have from 10 or 15 or 20 wt % to 30 or 25 or 40 wt % styrene derived units, by weight of the block copolymer, and within the range of from 30 or 40 or 45 wt % to 55 or 60 or 65 wt % vinyl groups.

Useful tire tread compositions can also comprise 15 to 50 or 60 wt % of a styrenic copolymer; 0 or 5 wt % to 60 wt % of a polybutadiene polymer; 0 to 60 wt % of natural rubber or synthetic polyisoprene; 15 to 50 or 60 wt % of a functionalized styrenic copolymer; 0 or 5 wt % to 60 wt % of a functionalized polar polybutadiene polymer; 0 or 5 wt % to 60 wt % of natural rubber or functionalized synthetic polyisoprene; 0 or 5 wt % to 20 or 40 wt % of processing oil; 20 wt % to 60 wt % of filler, especially silica-based filler as described herein; a curative agent; and 5 wt % to 20 wt % of a propylene-ethylene-diene terpolymer described herein, and 0 or 5 wt % to 40 wt % of a hydrocarbon resin, the weight percentages based on the total composition.

Inorganic Filler

The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 µm to 100 µm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name Zeosil™ Z1165.

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in the isoprene elastomer in the form of a masterbatch (see, for example, Applications WO 97/36724 or WO 99/16600).

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 m²/g, preferably from 30 to 400 m²/g. Mention will be made, as highly dispersible ("HDS") precipitated silicas, for example, of the Ultrasil 7000 and Ultrasil 7005 silicas from Degussa, the Zeosil 1165 MP, C5 MP and 1115 MP silicas from Rhodia, the Hi-Sil EZ150G silica from PPG, the Zeopol 8715, 8745 and 8755 silicas from Huber or silicas with a high specific surface.

Mention may also be made, as other examples of inorganic filler being capable of being used, of reinforcing aluminum (oxide), hydroxides, titanium oxides or silicon carbides (see, for example, application WO 02/053634 or US 2004/0030017).

When the compositions of the invention are intended for tire treads with a low rolling resistance, the reinforcing inorganic filler used, in particular if it is silica, preferably has a BET surface of from 45 to 400 m²/g, more preferably of from 60 to 300 m²/g.

Preferably, the level of total reinforcing filler (carbon black and/or reinforcing inorganic filler) is from 20 to 200 phr, more preferably from 30 to 150 phr, the optimum being in a known way different depending on the specific applications targeted: the level of the reinforcement expected with regard to a bicycle tire, for example, is, of course, less than that required with regard to a tire capable of running at high speed in a sustained manner, for example, a motor cycle tire, a tire for a passenger vehicle or a tire for a commercial vehicle, such as a heavy duty vehicle.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (V)

$$Z\text{-}A\text{-}S_x\text{-}A\text{-}Z \quad (V)$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (VI):

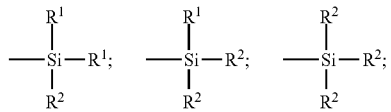

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula $[(C_2H_5O)_3Si(CH_2)_3Si_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxydi($C_1$-$C_4$)alkylsilylpropyl)polysulphides (in particular disulphides, trisulphides or tetrasulphides), more particularly bis(monoethoxydimethylsilylpropyl)tetrasulphide.

The coupling agent can also be bifunctional POSs (polyorganosiloxanes), or hydroxysilane polysulphides, or silanes or POSs bearing azodicarbonyl functional groups. The coupling agent can also include other silane sulphides, for example, silanes having at least one thiol (—SH) functional group (referred to as mercaptosilanes) and/or at least one masked thiol functional group.

The coupling agent can also include combinations of one or more coupling agents such as those described herein, or otherwise known in the art. A preferred coupling agent comprises alkoxysilane or polysulphurized alkoxysilane. A particularly preferred polysulphurized alkoxysilane is bis (triethoxysilylpropyl) tetrasulphide, which is commercially available by Degussa under the trade name X50S™.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

MES and TDAE oils are well known to a person skilled in the art; for example, reference is made to publication KGK (Kautschuk Gummi Kunstoffe), 52nd year, No. 12/99, pp. 799-805, entitled "Safe Process Oils for Tires with Low Environmental Impact".

Mention may be made, as examples of MES oils (whether they are of the "extracted" or "hydrotreated" type) or of TDAE oils, for example, of the products sold under the names Flexon™ 683 by ExxonMobil, Vivatec™ 200 or Vivatec™ 500 by H&R European, Plaxolene™ MS by Total, or Catenex™ SNR by Shell.

The resins (it should be remembered that the term "resin" is reserved by definition for a solid compound) formed of $C_5$ fraction/vinylaromatic copolymer, in particular of $C_5$ fraction/styrene or $C_5$ fraction/$C_9$ fraction copolymer, are well known; they have been essentially used to date for application as tackifying agents for adhesives and paints but also as processing aids in tire rubber compositions.

The $C_5$ fraction/vinylaromatic copolymer is, by definition and in a known way, a copolymer of a vinylaromatic monomer and of a $C_5$ fraction.

Styrene, alpha-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene and any vinylaromatic monomer resulting from a $C_9$ fraction (or more generally from a $C_8$ to $C_{10}$ fraction), for example, are suitable as vinylaromatic monomers. Preferably, the vinylaromatic compound is styrene or a vinylaromatic monomer resulting from a $C_9$ fraction (or more generally from a $C_8$ to $C_{10}$ fraction).

In a known way, the term $C_5$ fraction (or, for example, $C_9$ fraction respectively) is understood to mean any fraction resulting from a process resulting from petrochemistry or from the refining of petroleums, any distillation fraction predominantly comprising compounds having 5 (or respectively 9, in the case of a $C_9$ fraction) carbon atoms; the $C_5$ fractions, for example, may comprise, by way of illustration and without limitation, the following compounds, the relative proportions of which may vary according to the process by which they are obtained, for example according to the origin of the naphtha and the steam cracking process: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentene, 1-methylcyclopentene, 1-hexene, methylcyclopentadiene or cyclohexene. These fractions may be obtained by any chemical process known in the petroleum industry and petrochemistry. Mention may be made, as nonlimiting examples, of processes for the steam cracking of naphtha or processes for the fluid catalytic cracking of gasolenes, it being possible for these processes to be combined with any possible chemical treatment for the conversion of these fractions known to a person skilled in the art, such as hydrogenation and dehydrogenation.

Preferably, in the $C_5$ fraction/vinylaromatic copolymer (in particular $C_5$ fraction/styrene or $C_5$ fraction/$C_9$ fraction copolymer), the vinylaromatic compound (in particular styrene or $C_9$ fraction) is the minor monomer, expressed as molar fraction. Thus, more preferably, the percentage of aromatic protons (with regard to the total number of protons of the copolymer), determined in a known way by NMR analysis, is less than 50%, more preferably from 1% to 25% (mol %).

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A particularly preferred antioxidant is para-phenylenediamines, which is commercially available by Eastman under the trade name Santoflex™ 6 PP D (N-(1, 3-Dimethylbutyl)-N'-phenyl-1,4-phenylenediamine).

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred agent is sulfur.

Processing

The inventive tire tread composition may be compounded (mixed) by any conventional means known to those skilled in the art. The mixing may occur in a single step or in multiple stages. For example, the ingredients are mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, if used, are generally mixed in one or more non-productive mix stages. Most preferably, the polymers are mixed first at 110° C. to 130° C. for 30 seconds to 2 minutes, followed by addition of the silica, silica coupler and other ingredients, the combination of which is further mixed, most preferably at an increasing temperature up to 140° C. to 160° C. for 30 seconds to 3 or 4 minutes. Most desirably the silica is mixed in portions, most preferably one half, then the second half. The final curatives are mixed in the productive mix stage. In the productive mix stage, the mixing occurs at a temperature, or ultimate temperature, lower than the mix temperature(s) of the preceding nonproductive mix stage(s).

The tire tread composition has many desirable properties when the propylene-ethylene-diene terpolymer is present in the compositions. Also, the maximum Energy Loss (Tangent Delta, wherein the slope is zero) of the immiscible polyolefin domain of the cured composition is preferably a temperature within the range from −30 to 10° C. or −25 or −20 or −10° C. to −5 or 0 or 10° C. Finally, domains comprising the compatibilizer in the polymer matrix of the other components have sizes that are preferred to be less than 20 microns, more preferably less than 10 microns, and most preferably less than 5 microns; or within a range of from 0.1 or 0.2 or 0.5 or 1.0 microns to 5 or 10 or 20 microns.

The various descriptive elements and numerical ranges disclosed herein for the propylene-ethylene-diene terpolymers, the reactants used to make the propylene-ethylene-diene terpolymers, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

EXAMPLES

Preparation of Amorphous Propylene-Based Copolymers (PEDMs 2 to 4)

Catalyst system: Catalyst precursor was bis((4-triethylsilyl)phenyl)methylene(cyclopentadienyl)(2,7-di-tert-butyl-fluoren-9-yl) hafnium dimethyl. However, other metallocene precursors with good diene incorporation and MW capabilities could also be used.

The activator was dimethylanilinium tetrakis(pentafluorophenyl)borate, but dimethylanilinium-tetrakis(heptafluoronaphthyl)borate and other non-coordinating anion type activators or MAO could also be used.

Polymerizations: PEDMs 2 to 4 (Amorphous)

Polymerization experiments were performed in a continuous stirred tank reactor (CSTR) made by Autoclave Engineers, Erie Pa. The reactor was designed to operate at a maximum pressure and temperature of 2000 bar (30 kpsi) and 225° C., respectively, although the current experiments the nominal reactor pressures were lower, from 1600 to 1700 psig. The nominal reactor vessel volume was 150 mL. The working volume was smaller, approximately 120 mL, due to the stirrer. The reactor was equipped with a magnetically coupled external stirrer (Magnedrive). A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating band that was controlled by a programmable logic control device (PLC). Except for the heat losses to the environment, the reactor did not have cooling (semi-adiabatic operations).

The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall was maintained constant by adjusting the reactor heater output (skin temperature) and the catalyst feed rate. The target reactor temperature was maintained at 0.5-3 mol ppm catalyst concentrations in the feed. At these low catalyst concentrations, impurity control was the most critical factor in achieving controlled, steady state reactor conditions. Feed purification traps were used to control impurities carried by the monomer feed. The purification traps were placed right before the feed pumps and comprised of two separate beds in series: activated copper (reduced in flowing $H_2$ at 225° C. and 1 bar) for $O_2$ removal followed by a molecular sieve (5 A, activated in flowing $N_2$ at 270° C.) for water removal.

Propylene was fed from a low-pressure cylinder equipped with a dip leg for liquid delivery to the reactor. A heating blanket (Ace) was used to increase the propylene cylinder head pressure to 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a two-barrel continuous ISCO pump (model 500D). The monomer flow rate was adjusted by adjusting the motor speed of the pump and was measured by a Coriolis mass flow meter (Model PROline Promass 80, Endress and Hauser).

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, N.J.) and was pressurized to 5 psig with argon. The activated catalyst solution was delivered to the unit by a custom made two-barrel continuous high-pressure syringe pump (PDC Machines).

HPLC grade hexane (95% n-hexane, J. T. Baker) was used as solvent. It was purged with Argon for a minimum of four hours and was filtered once over activated basic alumina. The filtered hexane was stored in a 4-liter glass vessel (Ace Glass, Vineland, N.J.) inside an argon-filled dry box. The hexane was further purified by adding 1.5 mL (1.05 g) of trioctylaluminum (Aldrich #38,655-3) to the 4-liter reservoir of filtered hexane. 5-10 psig head pressure of argon was applied to the glass vessel to deliver the scavenger solution to a metal feed vessel from which the hexane was delivered to the reactor by a two-barrel continuous ISCO pump (model 500D).

Ethylidene norbornene (ENB) was purified by filtering through activated basic alumina. The filtered ENB was stored in a 4-liter glass vessel (Ace Glass, Vineland, N.J.) inside an argon-filled dry box. 5-10 psig head pressure of argon was applied to the glass vessel to deliver the scavenger solution to a 500 mL single-barrel ISCO pump, which in turn fed diene to the reactor.

Polymerization grade ethylene was compressed by a Fluitron A %-200 compressor and metered by a mass flow meter into the reactor.

During a polymerization experiment, the reactor was preheated to ~10-15° C. below that of the desired reaction temperature. Once the reactor reached the preheat temperature, the solvent pump was turned on to deliver hexane/trioctylaluminum scavenger solution to the reactor from the 4-liter scavenger solution feed vessel. This stream of scavenger/catalyst solution entered the reactor through a port on the top of the stirrer assembly to keep the polymer from fouling the stirrer drive. After the flow of solvent to the reactor was verified by monitoring the amount of solvent taken from the feed vessel, the monomer feeds were turned on. The monomers were fed to the reactor through a side port. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing solvent upstream of the reactor. The arrival of the catalyst to the reactor was indicated by an increase in the reaction temperature caused by the exothermic polymerization reaction. During the line-out period, the catalyst feed rate was adjusted to reach and maintain the target reaction temperature and conversion. The products were collected and weighed after vacuum-drying overnight at 70° C. Aliquots of the product were used for characterization without homogenizing the entire product yield.

Polymerization: PEDM 1 (a Propylene-Based Copolymer Crystalline Material)

Copolymer compositions as described above were synthesized as follows. The copolymer compositions were synthesized in two continuous stirred tank reactors connected in series. The effluent from the first reactor, containing a first copolymer component, unreacted monomers, and solvent, was fed, with additional monomers, to a second reactor where the polymerization was continued under different process conditions to produce a second copolymer component. The polymerization was performed in solution using isohexane as solvent. During the polymerization process, hydrogen addition and temperature control were used to achieve the desired melt flow rate. The catalyst, activated externally to the reactor, was added as needed in amounts effective to maintain the target polymerization temperature.

In the first reactor, the first copolymer component was produced in the presence of ethylene, propylene, and a catalyst comprising the reaction product of N,N-dimethylanilinium tetrakis(pentafluorophenyl)borate and [cyclopentadienyl(2,7-di-t-butylfluorenyl)di-p-triethylsilanephenylmethane]hafnium dimethyl.

In the second reactor, the second copolymer component was produced in the presence of ethylene, propylene, and a catalyst comprising the reaction product of N,Ndimethylanilinium tetrakis(pentafluorophenyl)borate and [cyclopentadienyl(2,7-di-t-butylfluorenyl) di-p-triethylsilanephenylmethane]hafnium dimethyl.

The mixed copolymer solution emerging from the second reactor was quenched and then devolatilized using conventionally known devolatilization methods, such as flashing or liquid phase separation, first by removing the bulk of the isohexane to provide a concentrated solution, and then by stripping the remainder of the solvent in anhydrous conditions using a devolatilizer so as to end up with a molten polymer composition containing less than 0.5 wt % of solvent and other volatiles. The molten polymer composition was advanced by a screw to a pelletizer from which the polymer composition pellets are submerged in water and cooled until solid.

TABLE 1 compounded propylene-ethylene-diene terpolymer additive

| | Compound 1 | Compound 2 | Compound 3 | Compound 4 |
|---|---|---|---|---|
| PEDM 2 | 100 | | | |
| PEDM 3 | | 100 | | |
| PEDM 4 | | | 100 | |
| PEDM 1 | | | | 100 |
| 6PPD | 2 | 2 | 2 | 2 |
| Stearic acid | 2 | 2 | 2 | 2 |
| N330 carbon black | 15 | 15 | 15 | 15 |
| Sulfur | 2.8 | 2.8 | 2.8 | 2.8 |
| Zinc Oxide | 2.5 | 2.5 | 2.5 | 2.5 |

TABLE 2

Characterization of PEDMs in Table 1

| | | FTIR | | DSC | | |
|---|---|---|---|---|---|---|
| | MFR | C2 wt % | ENB wt % | Tg (C.) | Tm (C.) | Hf (J/g) |
| PEDM 1 | 4 | 10 | 4.1 | −21.9 | 53.1 | 33.5 |
| PEDM 2 | 3.6 | 3.2 | 3.6 | −3.8 | — | — |
| PEDM 3 | 1.9 | 3.9 | 4.2 | −5.7 | — | — |
| PEDM 4 | 2.7 | 2.7 | 2.5 | −2.1 | — | — |

MFR (melt flow rate) measurements were obtained using a Dynisco Kayeness Polymer Test Systems Series 4003 apparatus following ASTM D1238 and ISO C3 methods.

DSC measurements were obtained by equilibrating at −80 C ramp at 10° C./minute to 120° C.; under $N_2$.

Sample Preparation of Compounds 1-4

Compound compositions for the four compounds are listed in Table 1. All components are listed in phr, or part per hundred of polymer, unit. These compounds were mixed in a single pass using a Brabender mixer which was warmed up to 170° C. All the ingredients were added except the sulfur and mixed for approximately 2 minutes at 100 rpms. The torque was recorded and the sulfur was added. The compounds were pulled after the torque increased 400 units from what was recorded before the sulfur was added.

Silica Tread Compounding

Tread compound compositions for four compounds, two reference compounds (control compounds with no additives) and four compounded examples, are listed in Table 3. All components are listed in phr, or part per hundred, of polymer unit.

The compositions were manufactured in appropriate mixers using two successive preparation phases well known to a person skilled in the art. In the first phase, the components were mixed in a Banbury mixer which was warmed up to a temperature of from 110° C. and 190° C., preferably from 130° C. to 180° C. The first phase mixed all components except the curative. After compounds were cooled, the same Banbury mixer was used to blend in the curatives during the second pass at from 40° C. to 110° C., preferably 70° C.

TABLE 3

Masterbatch ("Compound") and Neat Polymer Based tire tread compositions

| | Reference 1 & 2 | Example 1 | Example 2 | Example 3 | Example 4 | Example 5 | Example 6 | Example 7 | Example 8 |
|---|---|---|---|---|---|---|---|---|---|
| VSL 5025 (SBR 25% styrene, 50% vinyl) | 60 | 60 | 60 | 60 | 60 | 60 | 60 | 60 | 60 |
| Silica (Z1165) | 70 | 70 | 70 | 70 | 70 | 70 | 70 | 70 | 70 |
| PBD (Taktene 1203), high cis PBD | 40 | 40 | 40 | 40 | 40 | 40 | 40 | 40 | 40 |
| X50S (Si-69/N330 50/50) | 11.2 | 11.2 | 11.2 | 11.2 | 11.2 | 11.2 | 11.2 | 11.2 | 11.2 |
| Nytex 4700, (Naphthenic oil) | 20 | 20 | 20 | 20 | 20 | 20 | 20 | 20 | 20 |
| 6PPD | 2 | 2 | 2 | 2 | 2 | 2.24 | 2.24 | 2.24 | 2.24 |
| Compound 1 | | 15 | | | | | | | |
| Compound 2 | | | 15 | | | | | | |
| Compound 3 | | | | 15 | | | | | |
| Compound 4 | | | | | 15 | | | | |
| Stearic acid | 2.5 | 2.5 | 2.5 | 2.5 | 2.5 | 2.74 | 2.74 | 2.74 | 2.74 |
| N330 carbon black | | | | | | 1.81 | 1.81 | 1.81 | 1.81 |
| Sulfur | | | | | | 0.338 | 0.338 | 0.338 | 0.338 |
| Zinc Oxide | | | | | | 0.302 | 0.302 | 0.302 | 0.302 |
| PEDM 1 | | | | | | 12.07 | | | |

TABLE 3-continued

Masterbatch ("Compound") and Neat Polymer Based tire tread compositions

|  | Reference 1 & 2 | Example 1 | Example 2 | Example 3 | Example 4 | Example 5 | Example 6 | Example 7 | Example 8 |
|---|---|---|---|---|---|---|---|---|---|
| PEDM 2 |  |  |  |  |  |  | 12.07 |  |  |
| PEDM 3 |  |  |  |  |  |  |  | 12.07 |  |
| PEDM 4 |  |  |  |  |  |  |  |  | 12.07 |
| Productive (curative) |  |  |  |  |  |  |  |  |  |
| Zinc Oxide | 2.5 | 2.5 | 2.5 | 2.5 | 2.5 | 2.5 | 2.5 | 2.5 | 2.5 |
| Vulkacit CBS - N-Cyclohexyl-2-benzothiazolesulfenamide | 1.45 | 1.45 | 1.45 | 1.45 | 1.45 | 1.45 | 1.45 | 1.45 | 1.45 |
| Sulfur | 1.4 | 1.4 | 1.4 | 1.4 | 1.4 | 1.4 | 1.4 | 1.4 | 1.4 |
| Perkacit DPG - N,N'-Diphenylguanidine | 1.7 | 1.7 | 1.7 | 1.7 | 1.7 | 1.7 | 1.7 | 1.7 | 1.7 |

Loss Tangent Measurements

The compounds listed in Table 3 were compression molded and cured into pads. Afterward, a rectangular test specimen was cut off from the cured pads and mounted in an ARES (Advanced Rheometric Expansion System, TA instruments) for dynamic mechanical testing in torsion rectangular geometry. A strain sweep at room temperature (20° C.) up to 5.5% strains and at 10 Hz was conducted first followed by a temperature sweep at 4% strain and 10 Hz from −35° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 60° C. for better rolling resistance. As listed in Table 4, the addition of a propylene-ethylene-diene terpolymer increases the loss tangent values at temperatures of 0° C. without significantly raising the loss tangent value at 60° C.

tionalization of the propylene-ethylene-diene terpolymer in order to improve its curability and/or interaction with fillers.

Higher Crystallinity Propylene-Ethylene-Diene Terpolymer

A higher-crystallinity version of the inventive propylene-ethylene-diene terpolymer was also produced. The process and reaction conditions are similar to those disclosed except a C2 symmetric metallocene catalyst was used. In this example, a dimethylsilylbis(indenyl) hafnium dimethyl catalyst precursor was used with the borate described above. The resulting polymer preferably has an isotactic crystallinity greater than 15%, most preferably greater than 25%, or within a range from 15, or 25% to 50, or 70, or 80%. Table 5 is a summary of the results of four different higher crystallinity variants of the inventive PEDM.

TABLE 4

| Table 1. | Reference Avg. of 2 | Example 1 | Example 2 | Example 3 | Example 4 | Example 5 | Example 6 | Example 7 | Example 8 |
|---|---|---|---|---|---|---|---|---|---|
| Stress strain |  |  |  |  |  |  |  |  |  |
| 200% modulus (psi) | 1442 | 1463 | 1483 | 1536 | 1660 | 1526 | 1478 | 1434 | 1426 |
| Tensile strength (psi) | 2554 | 2064 | 2187 | 2391 | 2439 | 2501 | 2132 | 1734 | 2161 |
| Elongation (%) | 318 | 275 | 278 | 296 | 280 | 308 | 275 | 229 | 284 |
| Ares (DMTA), 10 Hz, 4% strain |  |  |  |  |  |  |  |  |  |
| Tan delta at 0 C | 0.344 | 0.440 | 0.420 | 0.453 | 0.361 | 0.361 | 0.451 | 0.416 | 0.461 |
| Tan delta at 60 C | 0.173 | 0.160 | 0.167 | 0.155 | 0.157 | 0.163 | 0.167 | 0.165 | 0.167 |
| MDR |  |  |  |  |  |  |  |  |  |
| Minimum torque (dNm) | 6.4 | 6.2 | 6.2 | 6.8 | 6.3 | 5.6 | 5.6 | 5.7 | 5.6 |
| Maximum torque (dNm) | 39.1 | 36.9 | 36.6 | 36.3 | 36.6 | 35.5 | 36.4 | 36.1 | 35.8 |

MDR was determined by ASTM D5279-01.
DMTA was determined by Ares - ASTM D5279-01.
Stress strain was determined by ISO37, British Std. dies (type #2).
Hardness was determined by ASTM D2240.

The addition of the propylene-ethylene-diene terpolymer to the tread compound allows one to significantly improve the traditional trade-off between tan delta at 0° C. and the tan delta values at 60° C. For example, see FIG. 1. The reference in FIG. 1 is tread compound without any additive.

The compounding step also provides the ability to concentrate an appropriate antioxidant (miscible in propylene-ethylene-diene terpolymer), filler (carbon black) and func-

TABLE 5

Results of higher crystallinity propylene-ethylene-diene terpolymer

| Name | C2 (wt %) | ENB (wt %) | MFR |
|---|---|---|---|
| A | 5.4 | 0.9 | 36 |
| B | 6.6 | 1.2 | 30 |
| C | 6 | 4.1 | 35 |
| D | 11.3 | 2.3 | 4 |

These higher crystallinity PEDM analogues can be incorporated into compositions useful for tire treads such as outlined in Table 6. They were tested for elasticity as outlined in Table 7 as described herein.

TABLE 6

Tire Tread Compositions including higher crystallinity propylene-ethylene-diene terpolymer (values in phr)

| component | 2-1 | 2-2 | 2-3 | 2-4 | 2-5 | 2-6 | 2-7 | 2-8 |
|---|---|---|---|---|---|---|---|---|
| Terpolymer D | 100 | 70 | 70 | — | — | 100 | — | — |
| Terpolymer A | — | 30 | — | 100 | — | — | 100 | — |
| 6PPD | 2 | 2 | 2 | 2 | 2 | 2 | 2 | 2 |
| Stearic acid | 2 | 2 | 2 | 2 | 2 | 2 | 2 | 2 |
| SLTD 2013 | — | — | 30 | — | 100 | — | — | 100 |
| CBS | — | — | — | — | — | 0.85 | 0.85 | 0.85 |
| Sulfur (#1) | 2.8 | 2.8 | 2.8 | 2.8 | 2.8 | 1.4 | 1.4 | 1.4 |
| DPG | — | — | — | — | — | 1 | 1 | 1 |
| Zinc Oxide | 2.5 | 2.5 | 2.5 | 2.5 | 2.5 | 2.5 | 2.5 | 2.5 |
| N330 carbon black | 15 | 15 | 15 | 15 | 15 | — | — | — |
| TOTAL PHR | 124.3 | 124.3 | 124.3 | 124.3 | 124.3 | 109.75 | 109.75 | 109.75 |

TABLE 7

Testing of Tire Tread Compositions

| Test/composition | | 2-8 | 2-7 | 2-6 |
|---|---|---|---|---|
| Test Time | min | 40 | 40 | 40 |
| Test Temp | ° C. | 160 | 160 | 160 |
| ML (minimum torque Mooney Viscosity) | dNm | 0.21 | 0.09 | 0.61 |
| MH (maximum torque Mooney Viscosity) | dNm | 5.62 | 2.96 | 13.44 |
| $T_{S2}$ (time to 2 lb. ft. in) | dNm | 8.27 | 19.75 | 2.5 |
| T10 (time required for 10% increase above mm) | min | 3.74 | 4.83 | 2.16 |
| T90 (time required for 90% increase above mm) | min | 27.87 | 29.82 | 23.13 |
| T50 (time required for 50% increase above mm) | min | 11.14 | 13.73 | 6.29 |
| Max Rate | dNm/min | 0.4 | 0.15 | 2.15 |

Now, having described the propylene-ethylene-diene terpolymers tire tread compositions, described herein in numbered paragraphs is:

1. A tire tread composition comprising components, alternatively, the cured reaction product of the components, by weight of the composition, within the range from 5 to 75 wt % of a diene elastomer; 0 to 40 wt % of processing oil; 20 to 80 wt % of filler; a curative agent; and 5 to 30 wt % of a propylene-ethylene-diene terpolymer containing from 2 to 40 wt % of ethylene and/or $C_4$-$C_{20}$ α-olefins derived units and having a heat of fusion, as determined by DSC, of from 0 J/g to 80 J/g.

2. The tire tread composition of numbered paragraph 1, wherein the filler is a silica-based filler.

3. The tire tread composition of numbered paragraphs 1 and 2, wherein the filler is a carbon black filler.

4. The tire tread composition of any one of the previous numbered paragraphs, wherein the filler is blend of silica-based filler and a carbon black filler.

5. The tire tread composition of any one of the previous numbered paragraphs, wherein the propylene-ethylene-diene terpolymer contains from 0.5 to 10 wt % ethylidene norbornene.

6. The tire tread composition of any one of the previous numbered paragraphs, wherein the propylene-ethylene-diene terpolymer contains from 2 wt % to 20 wt % ethylene.

7. The tire tread composition of any one of the previous numbered paragraphs, wherein the propylene-ethylene-diene terpolymer contains 5 wt % to 95 wt % propylene.

8. The tire tread composition of any one of the previous numbered paragraphs, wherein the Tg (° C.) of the tire tread composition is from 0 to −60.

9. The tire tread composition of any one of the previous numbered paragraphs, wherein the melt flow rate (MFR) at 2.16 kg weight at 230° C. propylene-ethylene-diene terpolymer is from 0.2 to 10 g/10 min.

10. The tire tread composition of any one of the previous numbered paragraphs, wherein the diene elastomer is a styrenic copolymer, a polybutadiene, natural rubber, a polyisoprene, a butadiene copolymer, an isoprene copolymer or blends thereof.

11. A method of balancing the wet traction performance and rolling resistance in a tire tread of any one of the preceding numbered embodiments:
   combining at least a filler, a diene-elastomer, and a curative agent with one or more propylene-ethylene-diene terpolymers to form a tire tread; wherein the propylene-ethylene-diene terpolymer containing from 2 wt % to 40 wt % of ethylene and/or $C_4$-$C_{20}$ α-olefins derived units, from 0.5 to 10 wt % of diene derived units, and having a heat of fusion, as determined by DSC, of from 0 J/g to 80 J/g;
   effecting a cure of the components to form a tire tread; and
   wherein the level of the propylene-ethylene-diene terpolymer(s) relative to the other components, and its comonomer content, can be varied to improve the balance of wet traction and rolling resistance of a tire tread.

Also disclosed is the use of the propylene-ethylene-diene terpolymer in a tire tread composition as described.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

The invention claimed is:

1. A tire tread composition comprising components, by weight of the composition, within the range from:
   5 to 75 wt % of a diene elastomer;
   0 to 40 wt % of processing oil;
   20 to 80 wt % of filler;
   a curative agent; and
   5 to 30 wt % of a propylene-ethylene-diene terpolymer containing from 2 to 40 wt % of ethylene and/or $C_4$-$C_{20}$ α-olefins derived units, from 2 wt % to 20 wt % ethylene, and from 0.5 to 10 wt % of ethylidene norbornene, and having a heat of fusion, as determined by DSC, of 0 J/g, and a melt flow rate (MFR) at 2.16 kg weight at 230° C. of 0.2 to 10 g/10 min.

2. The tire tread composition of claim 1, wherein the filler is a silica-based filler.

3. The tire tread composition of claim 1, wherein the filler is a carbon black filler.

4. The tire tread composition of claim 1, wherein the filler is blend of silica-based filler and a carbon black filler.

5. The tire tread composition of claim 1, wherein the propylene-ethylene-diene terpolymer contains 60 wt % to 95 wt % propylene.

6. The tire tread composition of claim 1, wherein the Tg (° C.) of the tire tread composition is from 0 to −60.

7. The tire tread composition of claim 1, wherein the diene elastomer is a styrenic copolymer, a polybutadiene, natural rubber, a polyisoprene, a butadiene copolymer, an isoprene copolymer or blends thereof.

8. The tire tread composition of claim 1, wherein the propylene-ethylene-diene terpolymer further comprises 1 to 4 phr sulfur.

9. The tire tread composition of claim 1, wherein the propylene-ethylene-diene terpolymer has a Tg (° C.) of from 0 to −20.

* * * * *